United States Patent [19]
Lia et al.

[11] Patent Number: 6,120,458
[45] Date of Patent: Sep. 19, 2000

[54] LOW PROFILE PRESSURE MEASURE DEVICE

[75] Inventors: Raymond A. Lia; Robert L. Vivenzio, both of Auburn; Scott S. Stearns, Marietta; Dominick A. Danna, Syracuse; Raymond P. Dromms, Liverpool; James M. Baxter, Jordan, all of N.Y.

[73] Assignee: Welch Allyn, Inc., Skaneateles Falls, N.Y.

[21] Appl. No.: 09/226,786

[22] Filed: Jan. 7, 1999

[51] Int. Cl.[7] .......................................................... A61B 5/02
[52] U.S. Cl. .............................. 600/490; 600/485; 73/715
[58] Field of Search .................................... 600/481, 485, 600/490; 73/715, 716, 729.2

[56] References Cited

U.S. PATENT DOCUMENTS

| | | |
|---|---|---|
| 1,106,341 | 8/1914 | Bristol . |
| 1,328,876 | 1/1920 | Hill . |
| 1,377,032 | 5/1921 | Starling et al. . |
| 1,409,028 | 3/1922 | Richter ....................... 73/715 |
| 2,087,494 | 7/1937 | Annin . |
| 2,564,669 | 8/1951 | Brady . |
| 2,636,394 | 4/1953 | Melchior . |
| 3,805,618 | 4/1974 | Csaposs et al. . |
| 3,874,242 | 4/1975 | Csaposs et al. . |
| 4,036,061 | 7/1977 | Speidel . |
| 4,040,298 | 8/1977 | Lee . |
| 4,050,314 | 9/1977 | Longhetto ................. 73/715 |
| 4,052,899 | 10/1977 | Longhetto ................. 73/715 |
| 4,255,970 | 3/1981 | Van Pottelberg . |
| 4,300,396 | 11/1981 | Buckshaw . |
| 4,347,744 | 9/1982 | Buchanan ................. 73/715 |
| 4,433,579 | 2/1984 | Horn ........................ 73/715 |
| 4,580,950 | 4/1986 | Sumikawa et al. . |
| 4,667,069 | 5/1987 | Cholkeri . |
| 4,685,336 | 8/1987 | Lee . |
| 4,856,339 | 8/1989 | Williams . |
| 5,082,019 | 1/1992 | Tetrault . |
| 5,181,422 | 1/1993 | Leonard et al. . |
| 5,557,049 | 9/1996 | Ratner ..................... 73/715 |
| 5,753,821 | 5/1998 | Chou ....................... 73/715 |

FOREIGN PATENT DOCUMENTS

| | | |
|---|---|---|
| 58-000729 | 5/1983 | Japan . |
| 1-063625 | 3/1989 | Japan . |
| 6-074848 | 3/1994 | Japan . |

*Primary Examiner*—Cary O'Connor
*Assistant Examiner*—Navin Natnithithadha
*Attorney, Agent, or Firm*—Wall Marjama & Bilinski

[57] ABSTRACT

A pressure sensitive device includes a housing having an interior cavity and a narrow downwardly extending portion. A support plate is disposed within the housing cavity along with a flexible diaphragm which is sealingly mounted to a bottom facing side of the support plate. A movement mechanism interconnected to the diaphragm includes a pressure sensitive element which is responsive to the impingement of incoming fluid on the sealed diaphragm. The movement mechanism is disposed within a narrow extending portion of the housing to assume a compact and shallow profile which facilitates direct attachment to existing devices, such as blood pressure sleeves. In a preferred version, the movement mechanism is disposed within a cavity defined by the diaphragm.

29 Claims, 4 Drawing Sheets

LOW PROFILE PRESSURE MEASURE DEVICE

FIELD OF THE INVENTION

This invention relates to the field of measuring devices, and more specifically to a compact pressure sensitive device.

BACKGROUND OF THE INVENTION

Pressure measuring devices, such as sphygmomanometers, include a pneumatic bulb which inflates a pressure chamber of an attached sleeve that is fitted over the arm or a leg of a patient. A diaphragm or bellows assembly, responsive to changes in fluid pressure of the pneumatic bulb and the sleeve pressure chamber is positioned in a dial indicator housing. The pointer of a dial indicator is interconnected to the bellows assembly by a movement mechanism, whereby inflation of the bellows causes corresponding circumferential movement of the pointer.

Typically, the above referred to movement mechanisms are quite intricate and complex, and are akin in terms of their manufacture and precision to Swiss watches. For example, in one such movement mechanism, a pair of diaphragm springs are attached adjacent opposing ends of a spindle. A bottom end of the spindle is placed in contact with the bellows assembly and a twisted bronze band perpendicularly disposed at the top end of the spindle is connected in parallel by a horizontally disposed bent spring part. As the spindle deflects axially in response to the inflation of the bellows, the bent spring part is also caused to deflect, thereby causing the band to twist. The pointer, attached to the bronze band, therefore is caused to rotate in relation to an adjacent dial face.

These devices include a plurality of moving components, each having multiple bearing surfaces. Therefore, such known assemblies must be manufactured with high degrees of tolerancing (and associated costs) in order to minimize errors.

In addition, any adjustments required after assembly of such mechanisms, such as to null the pointer or adjust the sensitivity of the device, require substantial teardown or at least significant and undesired disassembly of the measuring device.

Furthermore, separate support plates are required for independently supporting the movement mechanism and the bellows assembly, respectively, and for defining an expansion chamber for the bellows therebetween. Housings incorporating the same have compromised the ability to make a compact design.

A more recent and simplified movement mechanism developed by Applicants includes a vertically disposed axial cartridge including a spirally wrapped ribbon spring having one end mounted to an axially movable elongate pin and the remaining end to a fixed portion of the cartridge. A bottom portion of the pin is positioned relative to the expandable bellows, wherein subsequent axial translation of the pin elongates the spirally wound ribbon spring and produces repeatable circumferential movement of a pointer supported at the top end of the pin.

Subsequently, and in order to further reduce the overall size and complexity of the above structure, it has been determined that the diaphragm could be conveniently mounted and sealed relative to the bottom facing side of a single supporting plate, therefore making the design of a housing retaining the movement mechanism more compact.

However, even with the improved design, there is still a continuing need in the field to provide an even more compact and streamlined housing. There is also a preexisting need to even further reduce the level of complexity in the manufacture of pressure measuring devices without compromising the reliability thereof.

SUMMARY OF THE INVENTION

It is a primary object of the present invention to provide a pressure measuring device which overcomes the above deficiencies of the prior art.

It is another primary object of the present invention to provide a housing for a pressure measuring device, such as a blood pressure cuff, which is more compact and less expensive to manufacture than previously known devices while being equally reliable.

It is yet another primary object of the present invention to provide a housing for a lightweight, portable pressure sensitive device which can be effectively coupled to an inflatable sleeve, such as a blood pressure cuff.

Therefore and according to a preferred aspect of the present invention, there is disclosed a pressure sensitive device comprising:

- a housing having an interior cavity;
- a support plate disposed in said interior cavity and having a center opening;
- a diaphragm mounted to a bottom facing side of said support plate and having at least one movable surface responsive to changes in pressure of a fluid entering the interior cavity of said housing and an elongate center portion extending downwardly with respect to said support plate, said elongate center portion having an inner cavity;
- a dial face mounted to a front facing side of said support plate; and
- a movement mechanism interconnected with said at least one movable surface of said diaphragm, said movement mechanism including an axial cartridge disposed through said center opening of said support plate,
- wherein said housing includes a narrow downwardly extending section sized for retaining the downwardly extending center portion of said diaphragm having at least a portion of said axial cartridge situated within the inner cavity.

Preferably, the movement mechanism includes an axially displaceable shaft member having a spirally wound ribbon spring attached at one end thereof and an indicating member on an upper end thereof adjacent a dial face attached to the top facing side of the support plate.

Preferably, the dial face is directly attached to the top side of the support plate in a manner which allows the dial face to be rotated to provide zero adjustment relative to an indicating member of the movement mechanism. This eliminates the need for a separate zero or null adjusting mechanism, and effectively reduces the number of assembled parts.

In addition, a compact housing made in accordance with the above invention can include a docking hub or other suitable means which allows the housing to be fitted and sealed within other existing gauge housings with little modification thereto.

According to a preferred version, the device can be coupled directly to a blood pressure cuff without the need of hoses typically found. Furthermore, the overall compactness of the housing allows numerous applications for literally any form of device having a pressure sensitive element including, but not limited to, valves, gauges, switches, and leak detectors.

According to yet another preferred aspect of the present invention, there is disclosed a blood pressure measuring device comprising:

a housing having an interior cavity;

a support plate disposed in said housing interior and having a center opening;

a diaphragm mounted to a bottom facing side of said support plate, said diaphragm having at least one movable surface responsive to changes in pressure of an incoming fluid and a narrow elongate center portion extending downwardly with respect to said support plate, said narrow elongate center section having an inner cavity;

a dial face having indicating indicia mounted to a front facing side of said support plate; and a movement mechanism interconnected with said at least one movable surface of said diaphragm, said movement mechanism including an axial cartridge disposed through said center opening of said support plate, said housing including a narrow downwardly extending portion sized for receiving said narrow elongate center portion of said diaphragm and in which a portion of said axial cartridge is disposed in said inner cavity.

In a preferred embodiment, the downwardly extending portion of the housing can be directly coupled to an inflatable blood pressure cuff or sleeve. This attachment can take place without the need for hoses. Most preferably, the device housing, having a shallow profile, protrudes from the exterior of the sleeve and is sealed or otherwise attached thereto. Furthermore, in another preferred variation, the housing can be selectively rotated with respect to the inflatable sleeve, allowing either the patient or the caregiver to perform the measurement.

In another preferred variation, the housing can be used with an RF welded blood pressure sleeve in which the housing can be directly interconnected with the inflatable volume of the sleeve through a sealed port provided in the sleeve for attachment to the downwardly extending portion of the housing.

The proximity of the diaphragm within the housing interior to incoming fluid and the disposition of the movement mechanism within the attachment cavity of the housing affords significant overall savings in the space envelope of the device provides a more efficient and ore slender profile and allows the above attachment to be worthwhile.

Furthermore, additional required functions typically separate from the blood pressure cuff, such as a stethoscope adapter, can now be effectively combined with the housing and the sleeve in a more integrated and simple, lightweight system.

According to yet another preferred aspect of the invention, there is disclosed a pressure sensitive device comprising:

a housing including an upper portion, a lower portion, and an intermediate portion interconnecting said upper portion and said lower portion, each of said portions being hollow and having an interior cavity;

a support plate disposed in said lower portion, said support plate including a center opening aligned with said intermediate portion;

a diaphragm assembly attached to a bottom facing side of said support plate, said diaphragm having at least one surface which is movable in response to incoming fluid entering the interior of said lower portion of said housing; and a dial face disposed in the upper portion of said housing; and a movement mechanism interconnecting said at least one movable surface of said diaphragm and said dial face, said movement mechanism including an axial cartridge disposed substantially within said intermediate portion, said intermediate portion being substantially narrower than said upper and lower portions.

In a most preferred arrangement, a retaining slot can be cut or formed in an inflatable sleeve such as a blood pressure cuff, into which the intermediate and lower sections of the housing can be placed. The upper section having a very shallow profile can easily protrude from the exterior of the sleeve and can, therefore, be easily assimilated into an integral configuration.

Furthermore, due to the overall lightweight nature and improved features of the housing a stethoscope attachment can also be releasably attached to the housing and allow the assembly to perform multiple functions in a more unified and less separated type of device. This benefit has previously been unrealized in this industry.

An advantage is that a device utilizing a movement mechanism as described can be positioned conveniently within the housing so as to take advantage of its relatively narrow nature. In this manner, the housing can be more effectively designed by expanding the diaphragm or otherwise retaining the movement cartridge in a narrowed portion which allows effective interconnection to other existing devices.

Yet another advantage of the present invention is that creating a lightweight pressure sensitive housing as described allows improved manufacturability and versatility without compromising reliability.

Still another advantage of the present invention, particular to blood pressure measurement, is that the described streamlined housing lends itself to direct connection to the blood pressure sleeve without the need for hoses and provides additional compactness and efficient packaging. In addition, attachment to a blood pressure sleeve also allows other required functions such as stethoscopic to be combined with the housing.

Yet another advantage is that a housing made in accordance with the present invention has a very compact and relatively shallow profile and can therefore be easily configured for use in other known pressure sensitive devices, such as leak detectors, force gauges, barometers, pressure sensitive switches, valves and the like. Moreover, the simplicity of the present design lends itself to literally any form of pressure sensitive or pressure responsive device.

These and other objects, features, and advantages will become apparent from the following Detailed Description of the Invention which should be read in conjunction with the accompanying drawings.

DETAILED DESCRIPTION OF THE INVENTION

The present invention is herein described with reference to several preferred embodiments, each of which relates to blood pressure measuring apparatus. It should be evident, however, to one of sufficient skill in the field that other variations and modifications can be made utilizing the inventive concepts described herein, as well as alternate applications other than blood pressure measurement, including barometers, pressure vessel indicators, pressure sensitive switches, valves, and literally any device requiring a pressure responsive element. Furthermore and throughout the course of the following discussion, terms such as "upwardly", "downwardly", "upper", "lower", "top", "bottom" and the like are used to provide a frame of reference with regard to the accompanying figures. These terms, however, should not be treated as limiting with regard to the invention as herein described.

Figure 1:
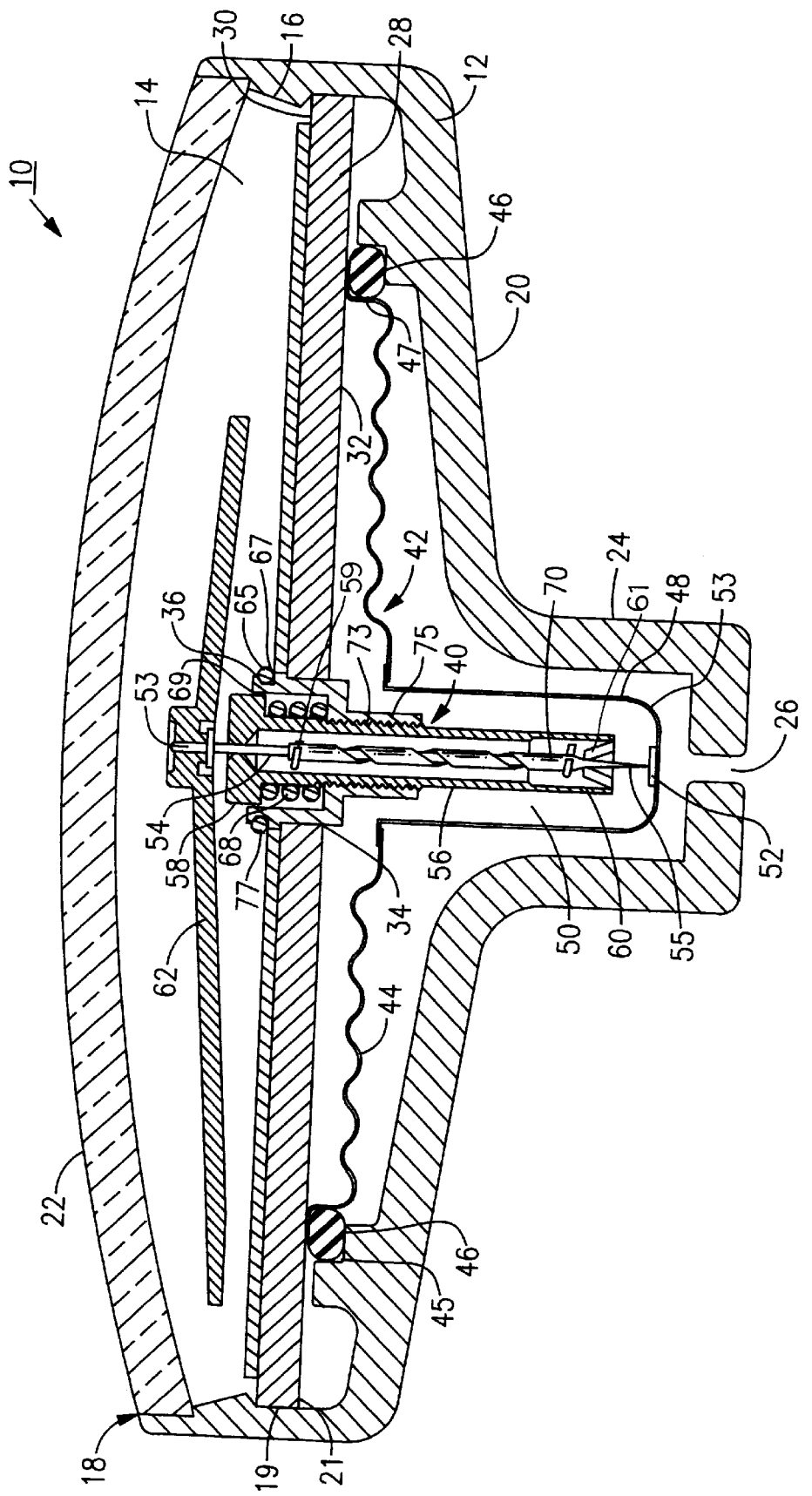
FIG. 1 is a sectional view of a pressure measuring device having a housing made in accordance with a first embodiment of the present invention.

Referring to FIG. 1 there is shown a pressure measuring device 10 made in accordance with a first embodiment of the invention. The device 10 includes a substantially cylindrical housing 12 having an interior cavity 14 defined by a circumferential inner wall 16, an open top end 18, and a bottom end 20. A window or bubble 22, made from glass or any convenient transparent material, is attached in a known manner to the open top end 18 of the housing 12. The bottom end 20 of the housing 12 has a diameter which inwardly tapers down to a narrow downwardly extending portion 24 having a bottom opening 26 serving as a port for admitting a fluid, as described in greater detail below. Preferably, the diameter of the narrow extending portion 24 is about one third that of the major portion of the housing, though it will be apparent from the following discussion that this parameter can be suitably varied.

The interior cavity 14 of the housing 12 is sized for retaining a number of component parts, including a support plate 28. The support plate 28 is a generally planar member having opposing top and bottom facing sides 30, 32, as well as a central through opening 34. A press fitted sleeve 36 attached to the top facing side 30 of the support plate 28 extends into the central through opening 34 and is used for retaining a movement mechanism 40, which is described in greater detail below. The circumferential inner wall 16 further includes a reflexed portion 19 which is sized for supporting an outer edge 21 of the support plate 18 immediately therebeneath and at a predetermined height within the housing 12. The central through opening 34 is shown as being substantially aligned with the bottom opening 26 according to this embodiment, but this alignment is not essential.

A diaphragm sub-assembly 42 includes a flexible diaphragm 44 which is non-fixedly attached to the bottom facing side 32 of the support plate 28. The diaphragm 44 is largely horizontally planar and includes a plurality of wave-like surfaces 49. The outer edge 47 of the diaphragm 44 is clamped thereto by an O-ring 46 disposed on a circumferential ledge 45 extending upwardly from the bottom end of the housing 12. The O-ring 46 not only supports the diaphragm 44 in place, but also provides a seal, the function of which is described in greater detail below. According to the invention, the centermost portion of the horizontally planar diaphragm 44 is cut or otherwise removed and replaced with a continuous downwardly extending section, hereinafter referred to as the pan 48, which is soldered or otherwise fixed to or integral with the remainder of the diaphragm. The pan 48 is a hollow cylindrical section which extends into the downwardly extending portion 24 of the housing 12 and having a cavity 50 which has a width dimension that is approximately equal to that of the press-fitted sleeve 36. A lower end 53 of the pan 48 includes a hardened or jeweled contact surface 52 on the interior thereof.

The movement mechanism 40 according to the present embodiment includes an axially displaceable shaft member 54 which is wholly enclosed within a tubular member 56 with the exception of protruding top and bottom ends 53, 55, respectively. A thin flexible ribbon-like spring section 70 is fixedly attached at one end adjacent the bottom end of the tubular member 56 and at an opposite remaining end 59 to the axially displaceable shaft member 54 around which the ribbon spring 70 is helically or spirally wound. The outer tubular member 56 includes a set of external threads 73 extending over an upper portion of the length thereof which engage corresponding internal threads 75 provided in the press-fitted sleeve 36. The ribbon-like section 70 is manufactured from beryllium copper, spring steel, or other similar material.

The hollow tubular member 56 includes an integral top cap portion 58 having a diameter which is larger than the remainder of the member, the cap portion having a shoulder 57 which bears against a biasing spring 68 disposed within an annular recess 68 of the pressfitted sleeve 36. The top cap portion 58 and the biasing spring 68 are used to adjust the overall sensitivity of the movement mechanism 40.

When correctly positioned, the majority of the movement mechanism 40 extends beneath the support plate 28 and into the cavity 50 defined in the pan 48 which is already positioned in the downwardly extending portion 24 of the housing 12. In this position, the bottom end 55 of the shaft member 54 is proximate the contact surface 52.

A dial face 63 having measuring indicia (not shown) is attached to the top facing side of the support plate 28 through a center opening which is sized to fit over the press fitted sleeve 36. An O-ring 65 disposed in a slot 67 of the sleeve 36 engages the inner edge of the dial face 63. An indicating member 62 is mounted to the protruding top end of the shaft member 54.

In operation, a change in the pressure of incoming fluid (in this example, air) enters the bottom opening 26 of the housing 12 and more particularly the interior cavity of the housing 12. The seal provided onto the outer edge 47 of the diaphragm 44 by the O-ring 46 clamping against the bottom facing side 32 of the support plate 28 prevents air from further penetrating the interior cavity 14. Therefore, the increase in pressure causes axial movement of the pan 48 and the interior contact surface 52 pushes upwardly against the bottom end 55 of the axially displaceable shaft member 54. As a result, the ribbon spring 70 extends against the fixed end 60 of the tubular member 56, causing the shaft member 54 to rotate. The rotation of the shaft member 54 causes a corresponding circumferential movement of the indicating member 62 attached to the top end 53 of the shaft member 34 relative to indicia (not shown) provided on the dial face 63.

Zero adjustment of the above assembly is a relatively simple procedure, as compared with previously known devices. First, the bubble 22 is removed from the open top end 17 of the housing 64. The engagement of the O-ring 65 against the inner edge of the dial face 63 allows the dial face to be freely rotated in relation to the position of the indicating member 62. Sensitivity adjustments can also be made at the top of the assembly by rotating the top cap portion 58 against the biasing spring 58 within the recess 69 of the press fitted sleeve 36, so as to adjust the sensitivity of the ribbon spring 70 for a given rotation. A similar mechanism is described in U.S. Ser. No. 08/972,583, the entire contents of which are incorporated by reference.

Figure 2:
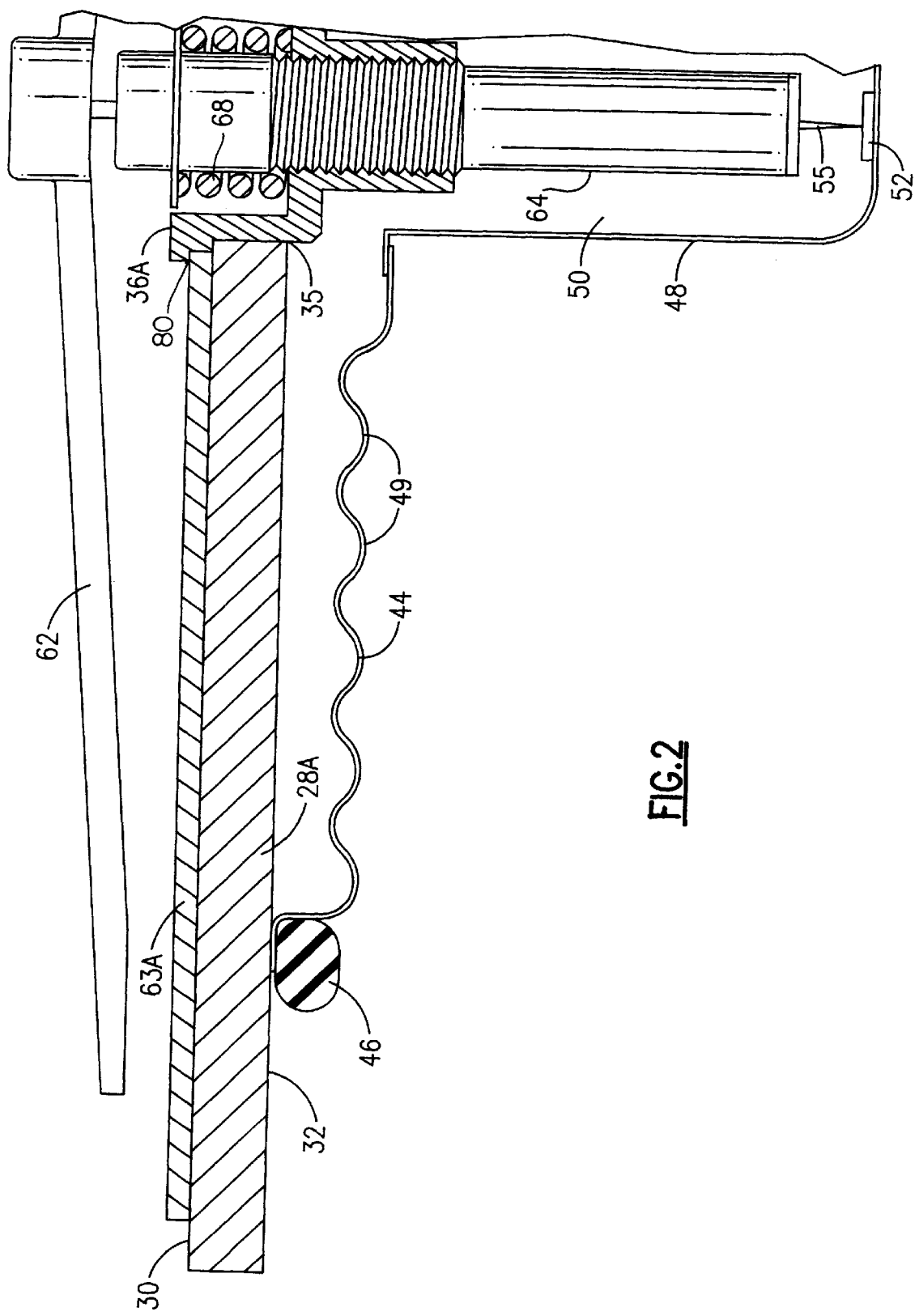
FIG. 2 is an enlarged sectional view of the pressure measuring device of FIG. 1, depicting alternate means for attaching a rotatable dial face in relation to the device.

Variations of the above assembly are possible. For example and referring to FIG. 2, and in lieu of the O-ring 65 of FIG. 1, the dial face 63A or the support plate 28 A can be suitably tapered adjacent their center openings relative to a slot 80 provided in the sleeve 36A in order to allow the dial face to be rotated without requiring removal. Alternately, the movement mechanism 40 can include a zero adjustment feature as described in the already incorporated U.S. Pat. No. 5,966,829 and U.S. Ser. No. 09/172,552. In passing, it should be noted that FIG. 2 only illustrates a portion of the overall assembly in order to amplify the above discussion.

Figure 3:
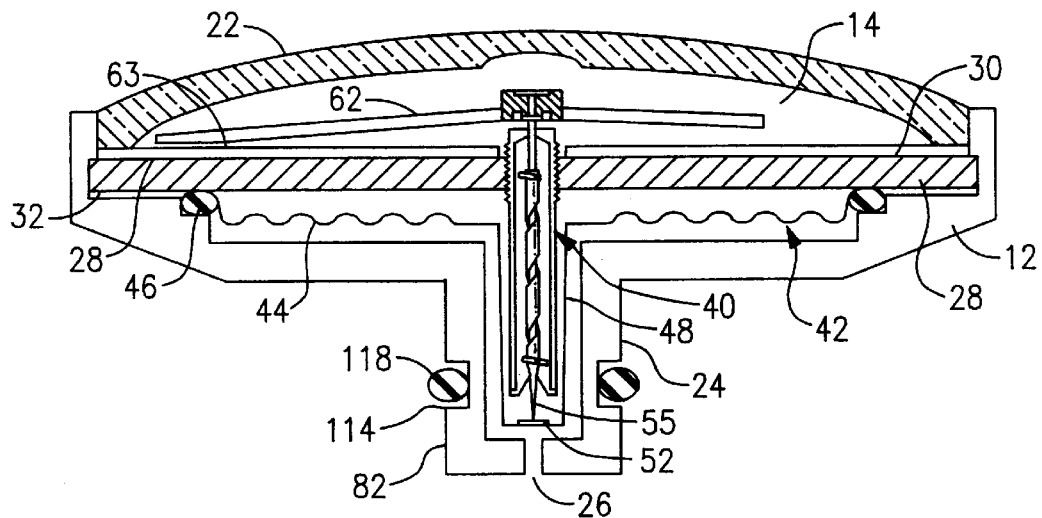
FIG. 3 is a sectional view of a pressure measuring device having a housing made in accordance with a second embodiment of the invention.

A housing design in accordance with a second embodiment is illustrated in FIG. 3. Similar parts are herein labeled with the same reference numerals for the sake of clarity. As in the preceding, the device includes a housing 12 having an interior cavity 14 sized for retaining a diaphragm subassembly 42 and a support plate 28, the housing further having a downwardly extending portion 24. A movement mechanism 40 is disposed through an opening in the support plate 28 such that the bottom end 55 of an axially displaceable shaft 34 of the mechanism is disposed in proximity to the contact surface 52 of a downwardly extending portion 48 of the diaphragm. The diaphragm, in the meantime, is attached, but sealed to the bottom facing side 32 of the support plate 28.

Fluid entering through a bottom opening 26 causes deflection of the extending portion 48 of the diaphragm 44 against the axially displaceable shaft 34, thereby causing rotation of the shaft by means of an attached ribbon spring 70, in the manner previously described. Rotation of the shaft 34 produces subsequent circumferential movement of an indicating member 62 in relation to a dial face 63 placed on the top facing side 30 of the support plate 28 which can be seen through a transparent window 22 of the housing 12 using O-ring 46.

In this embodiment, the device includes a docking hub 82 provided on the exterior of the downwardly extending portion 24, the hub including a circumferential slot 114 which is sized for retaining an O-ring 118 or other similar sealing element. For example, the docking hub 82 can utilize pipe threads (not shown). The docking hub 82 provides adequate modification to allow the device to be attached to other existing pressure device housings, having pressure sources or not such as those manufactured by Welch Allyn, Inc or others. In passing, it should be noted that the position of the bottom opening 26 is not essential; that is, incoming fluid can enter the interior cavity 14 from a horizontally or otherwise disposed port, so long as the opening is beneath the seal provided by the O-ring 118.

To further illustrate variations, a third embodiment of a housing 12B, made in accordance with the present invention, includes a diaphragm 44B, which unlike the preceding embodiment, is a substantially vertical member having an overall width dimension which is considerably narrower than the preceding. As a result, there is no need to provide a support plate 28B, which is fitted to the circumferential inner wall 16, but rather is positioned suitably by known means in a cavity 51 provided in the bottom end 20B of the housing 12B.

Like the preceding, the outer edge 47B of the diaphragm 44B is sealed using an O-ring 46B which effectively clamps the outer edge to the bottom facing side of the support plate 28B. The movement mechanism 40 is disposed essentially beneath the support plate 28B through a center opening in a press fitted sleeve 36B and threaded into engagement therewith. The majority of the movement mechanism 40 is disposed within the cavity defined by the essentially vertical diaphragm 44B, this particular diaphragm having its wavelike surfaces 49B vertically disposed. Adjustments to control the sensitivity of the movement mechanism 40 using biased spring 68B are performed similarly to that previously described.

Overall, the instant embodiment defines a very shallow profile in the upper portion of the housing 12B. Though not shown, the bottom end of the housing 12B can be used as a docking hub to secure the housing into other gauge housings (not shown) either as a retrofitted or new assembly.

Figure 4:
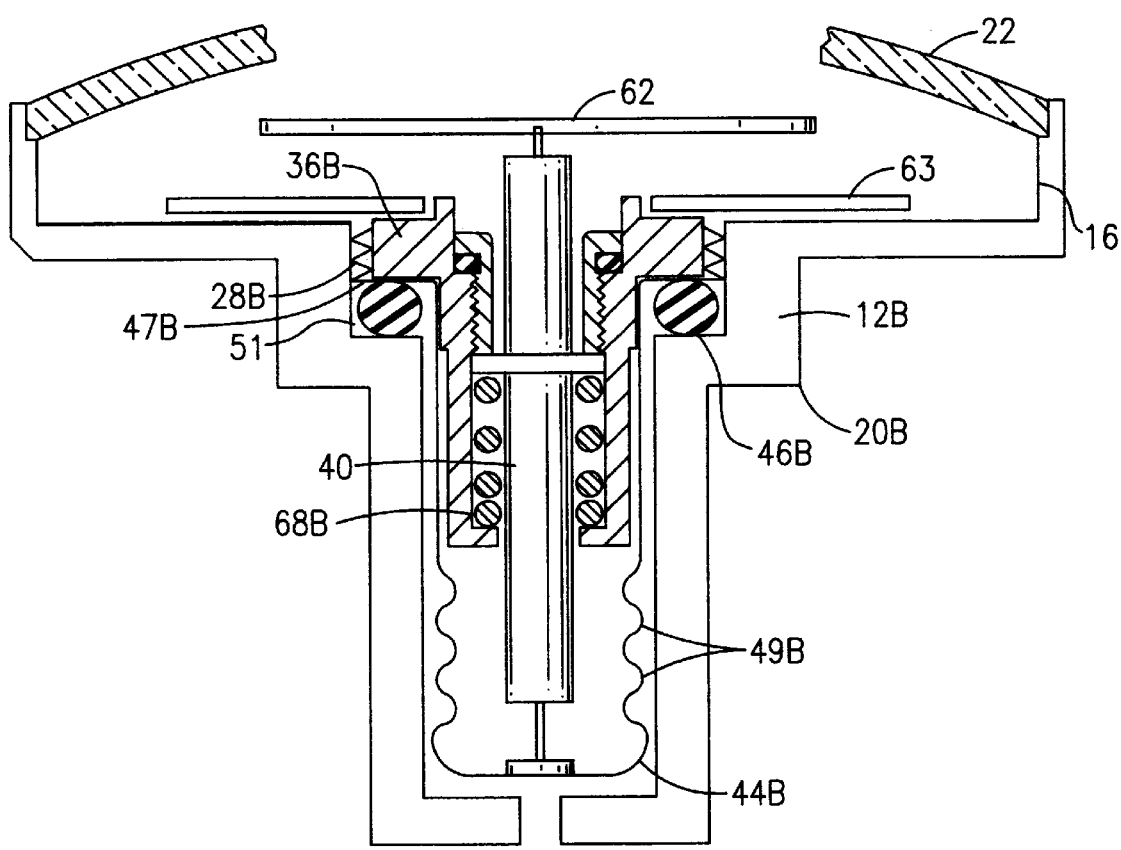
FIG. 4 is a sectional view of a pressure measuring device having a housing made in accordance with a third embodiment of the invention.

Referring to FIG. 4, a housing 140 formed in accordance with a fourth embodiment of the present invention is herein described in combination with a blood pressure cuff. For purposes of the present embodiment, the housing 140 is used with a specific blood pressure cuff or sleeve described in greater detail in commonly assigned and copending U.S. Ser. No. 09/109,779, the contents of which are hereby incorporated in their entirety. In brief, the inflatable cuff 142 is manufactured using a pair of sleeve portions 144, 146 which are sealed together using continuous RF (Radio Frequency) welds to form an integral structure and defining an inflatable inner volume 148. The cuff 142 is then wrapped around the arm 170 of a patient in a manner commonly known.

Unlike the preceding embodiments, the housing 140 described in the present embodiment includes an upper portion 152, a lower portion 154 and a connecting intermediate portion 156. The upper and lower portions 152, 154 are substantially cylindrical and have approximately the same dimensions while the intermediate portion 156 has a substantially smaller diameter and is therefore considerably narrower than either adjoining section, defining a configuration shaped somewhat like a yo-yo. According to the present embodiment, the intermediate portion 156 has a diameter which is approximately one third that of the remaining sections 152,154, though this parameter can be varied depending on the relative size of the movement mechanism used therein. Each of the above sections 152, 154, 156 are hollow and combine to form an interior cavity 158, similar in nature to those previously described.

According to this embodiment, a support plate 165 (shown in phantom) is positioned within the lower section 154 of the housing 140 while a dial face 167 (also shown in phantom) is disposed in the upper section 152. A movement mechanism 171 (also shown in phantom) similar to those previously described interconnects the dial face 167 and the support plate 165 and is located primarily in the intermediate portion 156.

According to this embodiment, a slot 162 is cut into the sleeve portions 144,146. The slot 162 provides a button-like retainment for the lower portion 154 and the narrow intermediate portion 156, with the upper portion 152 protruding from the exterior of the cuff 142. A port 176 is connected via a hose 178 to the inflatable inner volume of the cuff 142 which is inflated by a pneumatic bulb (not shown) in a well known manner.

In operation, the device operates similarly to that previously described except that a detachable stethoscope adapter 166 can be releasably attached to the bottom of the housing 150, forming an integral unit. The bottom of the housing 150, according to this embodiment, includes an extending attachment portion 174 sized to engage a female connector 180 or other suitable means provided on the adaptor. All preceding known cuffs require separation between the cuff and the stethoscope. With the overall shallow profile of the above housing 150, use of an adaptor 166 is made worthwhile.

The stethoscope adapter 166 is a conical member which forms the bell of the stethoscope having connecting ear pieces (not shown) attached to a port 184. In use, the adapter 166 is freely rotatable relative to the housing 140, allowing examination by a patient or a caregiver to be performed equally well.

PARTS LIST FOR FIGS. 1–5

| | |
|---|---|
| 10 | device |
| 12 | housing |
| 12B | housing |
| 14 | interior cavity |
| 16 | circumferential inner wall |
| 18 | open top end |
| 19 | reflexed portion |
| 20 | bottom wall |
| 21 | outer edge-support plate |
| 22 | bubble |
| 24 | downwardly extending portion |
| 26 | bottom opening |
| 28 | support plate |
| 28A | support plate |
| 28B | support plate |
| 30 | top facing side |
| 32 | bottom facing side |
| 34 | central through opening |
| 36 | sleeve |
| 36A | sleeve |
| 36B | sleeve |
| 40 | movement mechanism |
| 42 | diaphragm subassembly |
| 44 | diaphragm |
| 44B | diaphragm |
| 45 | circumferential ledge |
| 46 | O-ring |
| 46B | O-ring |
| 47 | outer edge |
| 48 | pan |
| 49 | wave-like surfaces |
| 49B | wave-like surfaces |
| 50 | cavity |
| 52 | contact surface |
| 53 | top end |
| 54 | shaft |
| 55 | bottom end |
| 56 | tubular member |
| 57 | shoulder |
| 58 | top cap portion |
| 59 | end-ribbon spring |
| 60 | bottom end |
| 61 | |
| 62 | indicating member |
| 63 | dial face |
| 63A | dial face |
| 64 | outer tubular shell |
| 65 | O-ring |
| 66 | threads |
| 67 | slot |
| 68 | biasing spring |
| 68B | biasing spring |
| 69 | recess |
| 70 | ribbon spring member |
| 72 | one end |

-continued

PARTS LIST FOR FIGS. 1–5

| | |
|---|---|
| 73 | threads |
| 75 | threads |
| 80 | slot |
| 82 | docking hub |
| 114 | slot |
| 116 | end |
| 118 | O-ring |
| 140 | housing |
| 142 | cuff |
| 144 | sleeve portion |
| 146 | sleeve portion |
| 148 | inner volume |
| 152 | upper [0005]portion |
| 154 | lower portion |
| 156 | intermediate portion |
| 162 | slot |
| 165 | support plate |
| 166 | detachable stethoscope attachment |
| 167 | dial face |
| 170 | arm |
| 171 | movement mechanism |
| 174 | extending attachment |
| 176 | port |
| 178 | hose |
| 180 | female connector |
| 184 | port |

Figure 5:
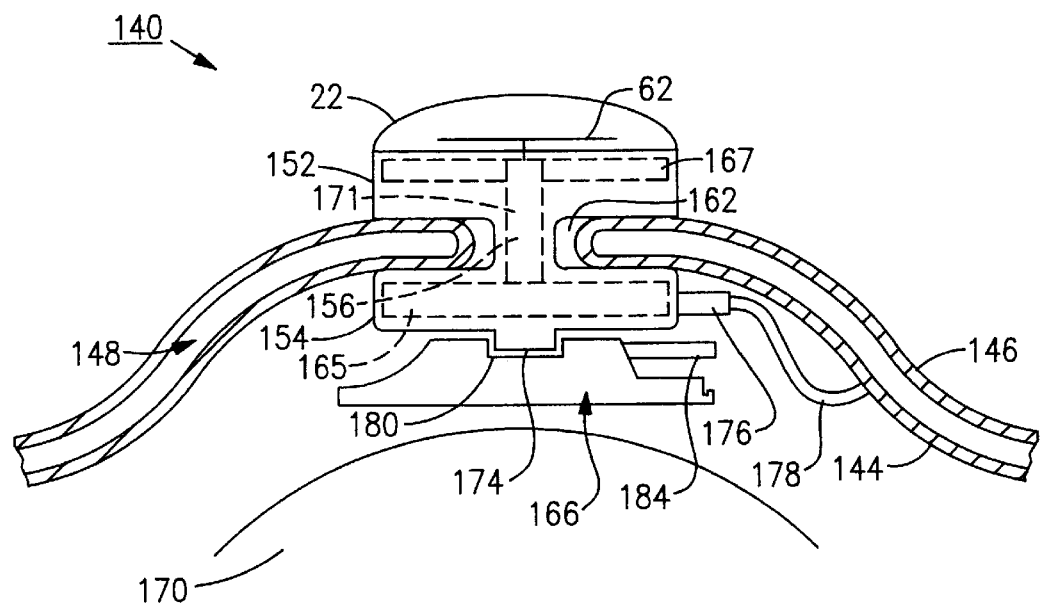
FIG. 5 is a partial sectional view of an pressure measuring device made in accordance with a fourth preferred embodiment of the present invention as used with an inflatable blood pressure sleeve.

It will be readily apparent to those of ordinary skill in the field that other variations and modifications are possible within the spirit and scope of the invention as defined by the following appended claims. For example, the housing described in FIG. 3 can be used in conjunction with a cuff as described in FIG. 5 by inserting the docking hub 82 into a receiving hole (not shown) provided in the cuff. Furthermore, the above assemblies can include multiple diaphragms, as required in certain pressure sensitive devices, with at least one or all of the diaphragms and/or housings being modified in the preceding manner to allow efficient positioning of the movement mechanism(s) therein.

We claim:

1. A pressure sensitive device comprising:

a housing having an interior cavity;

a support plate disposed in said interior cavity, said support plate having a center opening;

a diaphragm mounted to a bottom facing side of said support plate, said diaphragm having at least one movable surface responsive to changes in pressure of a fluid entering the interior cavity of said housing and an elongate center portion extending downwardly with respect to said support plate, said elongate center portion of said diaphragm having an inner cavity;

a dial face mounted to a top facing side of said support plate; and a movement mechanism interconnected with said at least one movable surface of said diaphragm, said movement mechanism including an axially displaceable shaft member and a thin ribbon spring member helically wound around said shaft member, said ribbon spring member having one end attached to one end of said axially displaceable shaft member and an opposing end attached to a stationary elongated hollow tubular member having at least a substantial axial portion of said axially displaceable shaft member and said helically wound ribbon spring member disposed within said hollow tubular member, said movement mechanism being disposed through said center opening of said support plate, wherein said housing includes a narrow downwardly extending section sized for retaining the elongate center portion of said diaphragm having at least a portion of said movement mechanism situated within said inner cavity of said elongate center portion.

2. A pressure sensitive device as recited in claim 1, wherein said axially displaceable shaft member includes an indicating member attached to an upper end of said shaft member, said shaft member having a lower end which is disposed in proximity to said at least one movable surface of said diaphragm.

3. A pressure sensitive device as recited in claim 1, including means for attaching said dial face to said support plate to allow said dial face to be rotated without requiring removal thereof.

4. A pressure sensitive device as recited in claim 1, wherein said narrow downwardly extending portion of said housing includes adapter means for selectively attaching said housing to various pressure-actuable devices.

5. A pressure sensitive device as recited in claim 4, wherein said adapter means includes sealing means for providing a fluid -tight seal between said housing and said various pressure-actuable devices.

6. A pressure sensitive device as recited in claim 5, wherein said adapter means includes an external circumferential slot provided on said narrow downwardly extending portion of said housing and a sealing member sized to fit within said slot.

7. A pressure sensitive device as recited in claim 6, wherein said sealing member is an O-ring.

8. A pressure sensitive device as recited in claim 5, wherein said various pressure-actuable devices includes a blood pressure sleeve, said sleeve having a receiving hole sized to directly receive said narrow downwardly extending portion of said housing.

9. A pressure sensitive device as recited in claim 8, wherein said housing is freely rotatable upon attachment to said blood pressure sleeve for allowing ease in reading the dial face of said housing.

10. A pressure sensitive device as recited in claim 1, wherein said narrow downwardly extending portion has a diameter which is at least one third of the diameter of the remainder of the housing.

11. A blood pressure measuring device comprising:

a housing having an interior cavity;

a support plate disposed in said interior cavity of said housing, said support plate having a center opening;

at least one diaphragm mounted to a bottom facing side of said support plate, said at least one diaphragm having at least one movable surface responsive to changes in pressure of an incoming fluid entering the interior cavity of said housing and a narrow elongate center portion extending downwardly with respect to said support plate, said narrow elongate center portion having an inner cavity;

a dial face having indicating indicia mounted to a top facing side of said support plate; and a movement mechanism interconnected with said at least one movable surface of said at least one diaphragm, said movement mechanism including an axially displaceable shaft member and a thin ribbon spring member helically wound around said shaft member, said ribbon spring member having one end attached to one end of said axially displaceable shaft member and an opposing end attached to a stationary elongated hollow tubular member wherein at least a substantial axial portion of said axially displaceable shaft member and said thin ribbon spring member is disposed within said hollow tubular member, said movement mechanism being disposed through said center opening of said support plate, said housing including a narrow downwardly extending portion sized for receiving said narrow elongate center portion of said diaphragm and in which at least a portion of said movement mechanism is disposed in said inner cavity of said elongate center portion.

12. A blood pressure measuring device as recited in claim 11, including an indicating member attached to an upper end of said axially displaceable shaft member, said shaft member having a lower end which is disposed in proximity to said at least one diaphragm.

13. A blood pressure measuring device as recited in claim 11, including means for attaching said dial face to said support plate to allow said dial face to be rotated without requiring removal thereof.

14. A blood pressure measuring device as recited in claim 11, wherein said narrow downwardly extending portion of said housing includes docking means for directly attaching said housing to an inflatable sleeve.

15. A blood pressure measuring device as recited in claim 14, wherein said inflatable sleeve includes a receiving hole sized to receive said narrow downwardly extending portion of said housing.

16. A blood pressure measuring device as recited in claim 15, including means for providing a fluid seal between said housing and said inflatable sleeve when said downwardly extending portion engages said receiving hole.

17. A blood pressure measuring device as recited in claim 15, wherein said sealing means includes an external circumferential slot provided on said narrow downwardly extending portion and a sealing member sized to fit within said slot.

18. A blood pressure measuring device as recited in claim 17, wherein said sealing member is an O-ring.

19. A pressure sensitive device as recited in claim 15, wherein said housing is freely rotatable when attached to said sleeve.

20. A pressure sensitive device as recited in claim 11, wherein said narrow downwardly extending portion has a diameter which is at least one third of the diameter of the remainder of the housing.

21. A pressure sensitive device comprising:

a housing including an upper portion, a lower portion, and an intermediate portion interconnecting said upper portion and said lower portion, each of said housing portions being hollow and having an interior cavity;

a support plate disposed in said lower portion, said support plate including a center opening aligned with said intermediate portion;

a diaphragm assembly attached to a bottom facing side of said support plate, said diaphragm having at least one surface which is movable in response to incoming fluid entering the lower portion of said housing;

a dial face disposed in the upper portion of said housing; and a movement mechanism interconnecting said at least one movable surface of said diaphragm, said movement mechanism including an axially displaceable shaft member and a thin ribbon spring member helically wound around said axially displaceable shaft member, said thin ribbon spring member having one end attached to one end of said axially displaceable shaft member and an opposing end attached to a stationary elongated hollow tubular hollow member having at least a substantial axial portion of said ribbon spring member and said axially displaceable shaft member disposed therein, said movement mechanism being disposed substantially within said intermediate portion of said housing, said intermediate portion being substantially narrower than said upper and lower portions.

22. A pressure sensitive device as recited in claim 21, including an indicating member attached to an upper end of said axially displaceable shaft member, said shaft member having a lower end which is disposed in proximity to said at least one movable surface of said diaphragm.

23. A pressure sensitive device as recited in claim 21, wherein said lower portion of said housing includes an extending mounting portion.

24. A pressure sensitive device as recited in claim 23, including a stethoscopic adapter which is attachable to said extending mounting portion of said housing.

25. A pressure sensitive device as recited in claim 21, including an inflatable sleeve, said sleeve including means for receiving said narrow intermediate portion and said lower portion of said housing so as to allow said upper portion to protrude from the exterior of said sleeve.

26. A pressure sensitive device as recited in claim 25, wherein said sleeve includes a pair of sleeve portions which are RF welded together, said receiving means including a slot which is formed through said welded sleeve portions.

27. A pressure sensitive device as recited in claim 26, including a stethoscopic adapter which is directly attachable to said extending mounting portion of said housing.

28. A pressure sensitive device as recited in claim 27, wherein said stethoscope adapter is freely rotatable about an attachment axis when attached to said housing.

29. A pressure sensitive device as recited in claim 21, wherein said intermediate portion housing said movement mechanism has an overall diameter which is at least less than one half of the diameter of the upper and lower sections of said housing.

* * * * *